US010833326B2

(12) United States Patent
Brew et al.

(10) Patent No.: US 10,833,326 B2
(45) Date of Patent: Nov. 10, 2020

(54) LOW-VOLTAGE MICROBATTERY WITH VANADIUM-BASED CATHODE

(71) Applicant: International Business Machines Corporation, Armonk, NY (US)

(72) Inventors: Kevin W. Brew, Albany, NY (US); Oki Gunawan, Westwood, NJ (US); Saurabh Singh, Queens, NY (US); Teodor K. Todorov, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 15/871,464

(22) Filed: Jan. 15, 2018

(65) Prior Publication Data

US 2019/0221842 A1   Jul. 18, 2019

(51) Int. Cl.

| | |
|---|---|
| *H01M 4/48* | (2010.01) |
| *H01M 10/0525* | (2010.01) |
| *H01M 4/04* | (2006.01) |
| *H01M 4/66* | (2006.01) |
| *H01M 10/0562* | (2010.01) |
| *H01M 10/0585* | (2010.01) |
| *H01M 10/04* | (2006.01) |
| *H01M 4/485* | (2010.01) |
| *H01M 4/02* | (2006.01) |

(52) U.S. Cl.
CPC ......... *H01M 4/483* (2013.01); *H01M 4/0404* (2013.01); *H01M 4/0407* (2013.01); *H01M 4/0459* (2013.01); *H01M 4/0471* (2013.01); *H01M 4/485* (2013.01); *H01M 4/661* (2013.01); *H01M 4/663* (2013.01); *H01M 4/667* (2013.01); *H01M 10/0436* (2013.01); *H01M 10/0525* (2013.01); *H01M 10/0562* (2013.01); *H01M 10/0585* (2013.01); *H01M 2004/021* (2013.01); *H01M 2220/30* (2013.01); *H01M 2300/0071* (2013.01)

(58) Field of Classification Search
None
See application file for complete search history.

(56) References Cited

U.S. PATENT DOCUMENTS

| | | | |
|---|---|---|---|
| 6,218,049 B1 | 4/2001 | Bates et al. | |
| 2011/0070500 A1* | 3/2011 | Chen | H01B 1/16 429/231.95 |
| 2014/0099251 A1* | 4/2014 | Kang | C01G 23/005 423/598 |
| 2014/0377657 A1 | 12/2014 | Lim et al. | |
| 2015/0027615 A1* | 1/2015 | Singh | H01M 10/04 156/60 |
| 2016/0111721 A1 | 4/2016 | Xiao et al. | |
| 2018/0131004 A1* | 5/2018 | Yang | H01M 4/0445 |

* cited by examiner

*Primary Examiner* — Karie O'Neill Apicella
(74) *Attorney, Agent, or Firm* — Randall Bluestone; Michael J. Chang, LLC

(57) ABSTRACT

Low-voltage rechargeable microbatteries having a vanadium-based cathode are provided. In one aspect, a method of forming a battery is provided. The method includes the steps of: forming a first contact on a substrate; forming a cathode on the first contact, wherein the cathode is formed from a vanadium-containing material; forming a solid electrolyte on the cathode; forming an anode on the solid electrolyte; and forming a second contact on the anode. A battery having a vanadium-based cathode is also provided.

19 Claims, 3 Drawing Sheets

LOW-VOLTAGE MICROBATTERY WITH VANADIUM-BASED CATHODE

FIELD OF THE INVENTION

The present invention relates to rechargeable batteries, and more particularly, to low-voltage rechargeable microbatteries having a vanadium-based cathode.

BACKGROUND OF THE INVENTION

There is a need for low-voltage rechargeable batteries for powering small electronic devices such as for wearable and "Internet of Things" (IOT) applications. Lithium (Li) ion batteries traditionally aim for high voltages with typical values above 3 volts (V).

However, the evolution of small electronic devices has reduced the voltage requirements making it possible to operate at values below 1V. Thus, for wearable and IOT applications, traditional Li ion batteries have become redundant and inefficient to recharge especially when alternative (recharging) energy sources such as photovoltaic devices are used.

Therefore, improved low-voltage microbattery designs would be desirable.

SUMMARY OF THE INVENTION

The present invention provides low-voltage rechargeable microbatteries having a vanadium-based cathode. In one aspect of the invention, a method of forming a battery is provided. The method includes the steps of: forming a first contact on a substrate; forming a cathode on the first contact, wherein the cathode is formed from a vanadium-containing material; forming a solid electrolyte on the cathode; forming an anode on the solid electrolyte; and forming a second contact on the anode.

In another aspect of the invention, a battery is provided. The battery includes: a substrate; a first contact disposed on the substrate; a cathode disposed on the first contact, wherein the cathode comprises a vanadium-containing material; a solid electrolyte disposed on the cathode; an anode disposed on the solid electrolyte; and a second contact disposed on the anode.

A more complete understanding of the present invention, as well as further features and advantages of the present invention, will be obtained by reference to the following detailed description and drawings.

DETAILED DESCRIPTION OF PREFERRED EMBODIMENTS

Provided herein are improved low-voltage (e.g., operating at less than 1 volt (V)), rechargeable micro-batteries, and techniques for fabrication thereof, that employ a vanadium-based cathode and a solid electrolyte. The term "microbattery" as used herein refers to a battery used to power miniaturized electronic devices (such as wearable, or internet of things (JOT) devices) and as such requires a battery that is itself miniaturized, e.g., the battery has dimensions less than about 5 millimeters (mm). As provided above, these small electronic devices have reduced voltage requirements making it possible for them to operate at values below 1V.

For scalability, the liquid electrolyte commonly employed in Li ion batteries needs to be replaced with a solid electrolyte. Solid state batteries are easier to miniaturize as they can be fabricated as thin film stacks. Further, lithium cobalt oxide ($LiCoO_2$) is commonly employed as the positive electrode, i.e., cathode, in Li ion batteries. Excessive exposure to cobalt (Co), a heavy metal, can be toxic to humans. As such, the presence of Co in small wearable electronic devices is a concern, and alternatives are desirable.

Advantageously, the present techniques provide a novel microbattery having a combination of Li intercalation electrode materials with a difference between the equilibrium potentials adequate for lower voltage applications, and methods for making the same. Notably, in the present design, the common $LiCoO_2$ cathode is substituted with vanadium oxide ($V_2O_5$). A $V_2O_5$ cathode provides a potential about 0.7 V lower than $Li^+/Li^0$ which permits the fabrication of a micro-battery with lower overall potential. Further, $V_2O_5$ replaces the potentially toxic heavy metal Co present in the devices.

Figure 1:
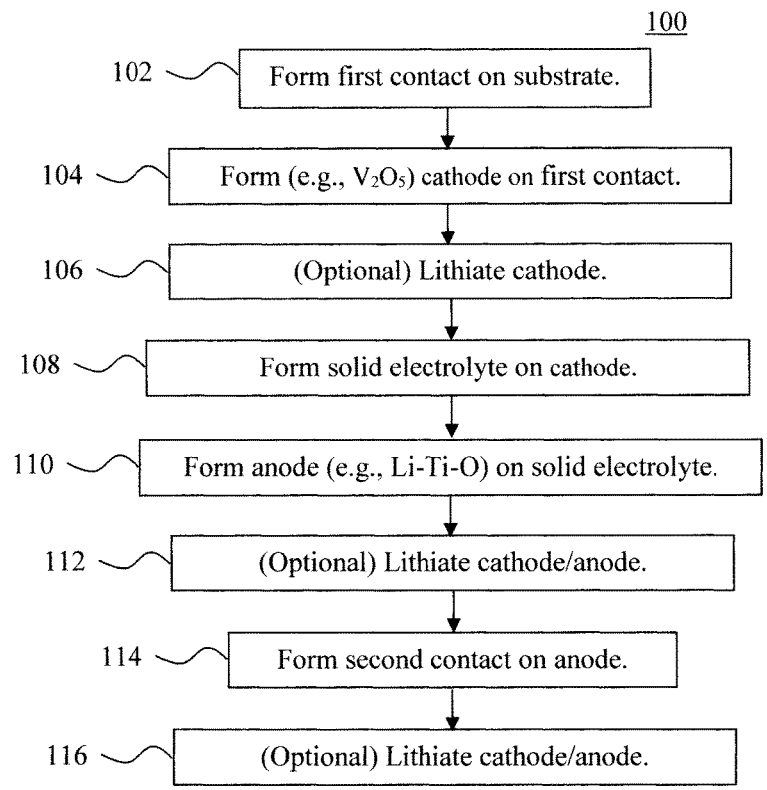
FIG. 1 is a diagram illustrating an exemplary methodology for forming a micro-battery according to an embodiment of the present according to an embodiment of the present invention.

An exemplary embodiment of the present techniques is now described by way of reference to methodology 100 of FIG. 1 for forming a micro-battery. The process begins with a substrate. If electrically conductive, the substrate itself (or the substrate in combination with an additional conductive layer(s)) can serve as a contact (i.e., current collector) of the micro-battery. On the other hand, if electrically non-conductive, the substrate is then coated with a conductive layer(s) that forms a contact with the cathode. See step 102. This contact at the substrate is one of two contacts (i.e., current collectors) of the micro-battery one being to the cathode and the other to the anode. For clarity, the contacts to the cathode and anode may also be referred to herein as first and second contacts, respectively.

Suitable substrates include, but are not limited to electrically non-conductive substrates such as glass, ceramics, polymers, silicon, and electrically conductive substrates such as metal foils (e.g., including, but not limited to copper, vanadium, steel, aluminum, and/or nickel metal foils). As per step 102, in the case of non-conductive substrates and optionally in the case of metal foils that otherwise serve as a contact themselves, one or more contact layers can be disposed on top of the substrate forming the first contact with the cathode. According to an exemplary embodiment, the first contact is formed from a metal (e.g., copper, indium, aluminum, and/or nickel) that is electroplated onto the substrate.

Next, in step 104 a cathode is formed on the first contact. The cathode can be formed by a variety of techniques including vacuum-based (e.g., sputtering or evaporation) or solution-based coating (e.g., spin-coating, spray-casting, etc.). According to an exemplary embodiment, the cathode is formed from a vanadium (V)-containing material such as $V_2O_5$. A suitable source for $V_2O_5$ is vanadium oxytriisopropoxide:

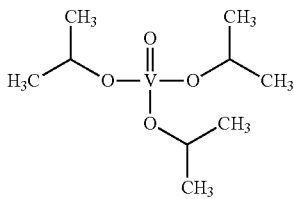

By way of example only, a solution can be prepared containing vanadium oxytriisopropoxide dissolved in a solvent (such as ethanol). A casting process such as spin-coating can be used to deposit the solution onto the first contact, followed by an anneal under conditions sufficient to form a layer of $V_2O_5$ on the first contact. By way of example only, the conditions include an anneal in air at a temperature of from about 500 degrees Celsius (° C.) to about 600° C., and ranges therebetween (e.g., at about 540° C.), for a duration of from about 1 minute to about 5 minutes, and ranges therebetween (e.g., for about 1 minute). In order to achieve the proper thickness of the cathode layer, this depositing and annealing cycle can be repeated multiple times. For instance, after spin-coating and annealing (as proscribed above), another round(s) of spin-coating and annealing can be performed, which will increase the thickness of the cathode layer on the first contact. This process can be iterated multiple times (each time employing the above-described specifications) until a desired thickness of the layer is achieved. According to an exemplary embodiment, the spin-coating and annealing cycle is repeated n times, wherein n=2-5 (e.g., n=4). This produces a cathode having a thickness of from about 0.5 micrometers (μm) to about 1.5 μm, and ranges therebetween.

An optional lithiation of the cathode and/or anode can be performed in accordance with the present techniques. This lithiation can be carried out at one or more different points in the process flow. For instance, lithiation can be performed immediately following formation of the cathode (see step 106), immediately following formation of the anode (see step 112), and/or after completion of the micro-battery stack (see step 116). For instance, immediately following formation of the cathode, an optional lithiation/lithiating step 106 is performed to introduce Li ions into the cathode using, e.g., chemical or electrochemical lithiation. Chemical lithiation involves immersing the micro-battery stack formed up to that point in the process flow, i.e., substrate/first contact/cathode, in a Li-compound solution such as n-butyllithium. Electrochemical lithiation involves submerging the micro-battery stack in an electrolyte along with a Li-containing electrode, and using a bias voltage to drive Li ions into the cathode (see below).

In step 108, a solid electrolyte is formed on the cathode. According to an exemplary embodiment, the solid electrolyte is formed from lithium niobium oxide (Li—Nb—O). Suitable sources for Li—Nb—O are lithium acetate and niobium ethoxide. In another exemplary embodiment, the solid electrolyte is formed from lithium lanthanum titanate (Li—La—Ti—O) and/or lanthanum ethoxide. Suitable sources for Li—La—Ti—O are lithium acetate, lanthanum ethoxide and titanium isopropoxide.

By way of example only, a solution can be prepared containing lithium acetate and niobium ethoxide dissolved in a solvent (such as ethanol). A casting process such as spin-coating can then be used to deposit the solution onto the cathode, followed by an anneal under conditions sufficient to form a layer of electrolyte on the cathode. By way of example only, the conditions include an anneal in air at a temperature of from about 500° C. to about 600° C., and ranges therebetween (e.g., at about 540° C.), for a duration of from about 1 minute to about 5 minutes, and ranges therebetween (e.g., for about 1 minute). In order to achieve the proper thickness of the electrolyte, this depositing and annealing cycle can be repeated multiple times. For instance, after spin-coating and annealing (as proscribed above), another round(s) of spin-coating and annealing can be performed, which will increase the thickness of the electrolyte on the cathode. This process can be iterated multiple times (each time employing the above-described specifications) until a desired thickness of the layer is achieved. According to an exemplary embodiment, the spin-coating and annealing cycle is repeated n times, wherein n=2-5 (e.g., n=4). This produces an electrolyte having a thickness of from about 0.5 μm to about 1.0 μm, and ranges therebetween.

In step 110, an anode is formed on the solid electrolyte. According to an exemplary embodiment, the anode is formed from lithium titanium oxide (Li—Ti—O). Suitable sources for Li—Ti—O are Ti isopropoxide and lithium acetate. By way of example only, a solution can be prepared by dissolving Ti isopropoxide and lithium acetate in ethanol, adding acetic acid and water to improve the solubility. A casting process such as spin-coating can then be used to deposit the solution onto the solid electrolyte, followed by an anneal under conditions sufficient to form a layer of Li—Ti—O on the solid electrolyte. By way of example only, the conditions include an anneal in air at a temperature of from about 500° C. to about 600° C., and ranges therebetween (e.g., at about 540° C.), for a duration of from about 1 minute to about 5 minutes, and ranges therebetween (e.g., for about 1 minute). In order to achieve the proper thickness of the anode, this depositing and annealing cycle can be repeated multiple times. For instance, after spin-coating and annealing (as proscribed above), another round(s) of spin-coating and annealing can be performed, which will increase the thickness of the anode on the electrolyte. This process can be iterated multiple times (each time employing the above-described specifications) until a desired thickness of the layer is achieved. According to an exemplary embodiment, the spin-coating and annealing cycle is repeated n times, wherein n=2-5 (e.g., n=4). This produces an anode having a thickness of from about 0.5 μm to about 1.5 μm, and ranges therebetween.

As provided above, one point in the process flow where an optional lithiation/lithiating step can be carried out is immediately following formation of the anode (as well as after formation of the cathode and/or after completion of the micro-battery stack). Thus, optionally, in step 112 a lithiation/lithiating step is performed to introduce Li ions into the cathode/anode.

According to an exemplary embodiment, the lithiation is carried out using chemical or electrochemical lithiation. As provided above, chemical lithiation involves immersing the micro-battery stack formed up to that point in the process flow, i.e., substrate/first contact/cathode/solid electrolyte/ anode, in a Li-compound solution such as n-butyllithium. Electrochemical lithiation involves placing (e.g., submerging) the micro-battery stack, i.e., substrate/first contact/ cathode/solid electrolyte/anode, in an electrolyte along with a Li-containing electrode, and supplying a bias voltage to the battery and the Li-containing electrode to drive Li ions into the anode. See, for example, FIG. 2.

Figure 2:
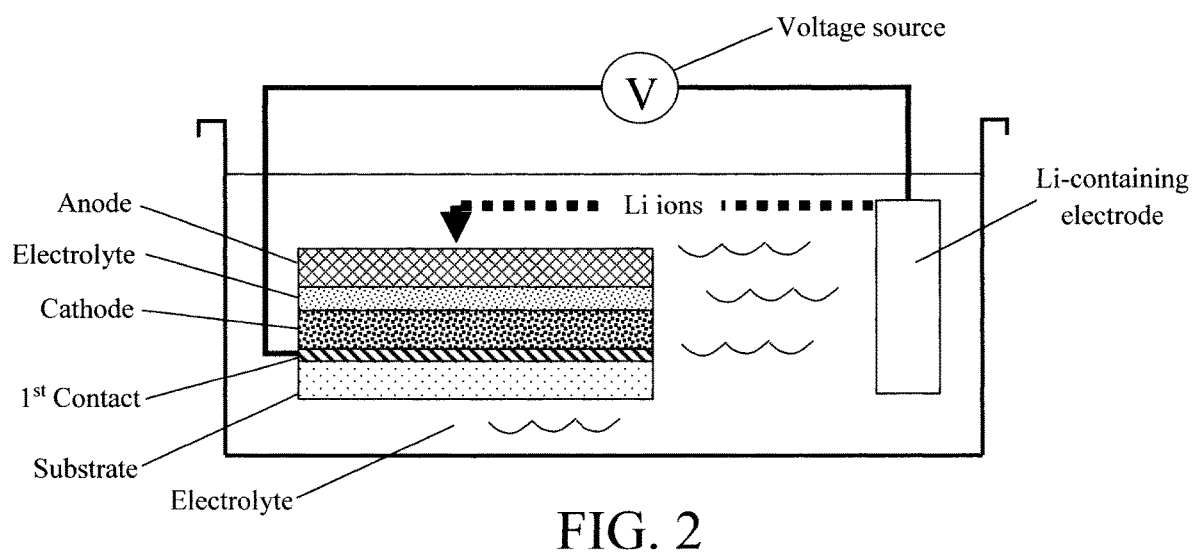
FIG. 2 is a diagram illustrating electrochemical lithiation being used to drive lithium (Li) ions into an anode of the micro-battery according to an embodiment of the present invention

Referring briefly to FIG. 2, the micro-battery stack is shown submerged in a liquid electrolyte bath. Suitable liquid electrolytes include, but are not limited to, lithium hexafluorophosphate ($LiPF_6$) in ethylene carbonate. A Li-containing electrode is also submerged in the liquid electrolyte. Suitable Li-containing electrodes include, but are not limited to, a lithium cobalt oxide ($LiCoO_2$) electrode. The set up shown in FIG. 2 applies to any of the lithiation steps described throughout the process, however the configuration of the micro-battery stack will vary depending on what point in the process the lithiation is performed and what component layers of the micro-battery stack have been formed up to that point.

A voltage source is then used to apply a bias voltage to the micro-battery stack (e.g., via the first contact) and to the Li-containing electrode. The applied voltage bias will drive Li ions from the Li-containing electrode into the cathode/ anode. Following lithiation, the micro-battery stack is removed from the liquid electrolyte bath and dried, for example, at a temperature of from about 100° C. to about 150° C. (e.g., at about 140° C.) until dry.

In step 114 a contact (i.e., current collector) is formed on the anode. As provided above, this is the second contact of the micro-battery stack and is formed to the anode. According to one exemplary embodiment, this second contact is formed from a conductive carbon paste that is painted onto the anode. Conductive carbon pastes are commercially available, e.g., from Structure Probe, Inc., West Chester, Pa. The conductive carbon paste can be applied (painted) onto the anode using a brush followed by an anneal under conditions sufficient to form a layer of conductive carbon on the anode. By way of example only, the conditions include an anneal in air at a temperature of from about 500° C. to about 600° C., and ranges therebetween (e.g., at about 540° C.), for a duration of from about 1 minute to about 5 minutes, and ranges therebetween (e.g., for about 1 minute). In order to achieve the proper thickness of the second contact, this depositing and annealing cycle can be repeated multiple times. For instance, after painting/applying and annealing (as proscribed above), another round(s) of painting/applying and annealing can be performed, which will increase the thickness of the second contact on the anode. This process can be iterated multiple times (each time employing the above-described specifications) until a desired thickness of the layer is achieved. According to an exemplary embodiment, the painting/applying and annealing cycle is repeated n times, wherein n=2-5 (e.g., n=4). This produces a second contact having a thickness of from about 0.5 µm to about 1.0 µm, and ranges therebetween.

According to another exemplary embodiment, the second contact is formed by depositing a metal layer onto the anode by vacuum deposition, paste coating or mechanical pressing of a foil. Suitable metals include, but are not limited to, copper, indium, aluminum, and/or nickel. By way of example only, the metal layer can be copper, indium, aluminum, and/or nickel foil that can be placed onto the anode, and the back side of the foil (i.e., opposite the anode) can be pressed (e.g., using a roller) to adhere the metal foil to the anode. According to an exemplary embodiment, the second contact is formed having a thickness of from about 0.1 µm to about 500 µm, and ranges therebetween.

As provided above, following completion of the micro-battery stack is yet another point in the process flow at which an optional lithiation/lithiating step can be carried out (as well as after formation of the cathode and/or after formation of the anode). Thus, optionally, in step 116 a lithiation/ lithiating step is performed to introduce Li ions into the cathode/anode using, e.g., chemical or electrochemical lithiation. Both of these lithiation processes were described in detail above.

Figure 3:
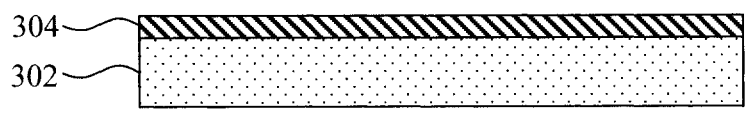
FIG. 3 is a cross-sectional diagram illustrating a first contact having been formed on a substrate according to an embodiment of the present invention.

Given the above description, FIGS. 3-7 illustrate an exemplary embodiment for forming a micro-battery in accordance with methodology 100 of FIG. 1. The process begins, as shown in FIG. 3, with a first contact 304 having been formed on a substrate 302. As provided above, the substrate 302 can be an electrically non-conductive substrate (such as glass, ceramics, polymers, silicon, or an electrically conductive substrate such as metal foils (e.g., including, but not limited to copper, vanadium, steel, aluminum, and/or nickel metal foils). When electrically conductive, the substrate 302 itself can serve as the first contact of the micro-battery stack. However, when the substrate 302 is electrically non-conductive then an additional first contact 304 needs to be formed on the substrate 302 to provide a contact to the cathode. Optionally, a first contact 304 may be formed on an electrically conductive substrate 302 if so desired (e.g., to increase the size of the current collector at the cathode). As provided above, suitable materials for the first contact 304 include, but are not limited to, metals such as copper, indium, aluminum, and/or nickel that are electroplated onto the substrate 302.

Figure 4:
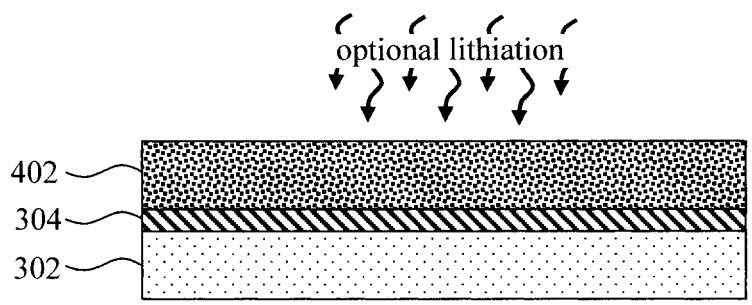
FIG. 4 is a cross-sectional diagram illustrating a cathode having been formed on the first contact (followed by an optional lithiation) according to an embodiment of the present invention.

Next, as shown in FIG. 4, a cathode 402 is formed on the first contact 304. As provided above, suitable materials for the cathode 402 include, but are not limited to, $V_2O_5$. A casting process, such as spin coating, can be used to deposit a solution containing vanadium oxytriisopropoxide dissolved in a solvent (such as ethanol) onto the first contact 304, followed by an anneal (see above). The casting and annealing process can be iterated multiple times until a cathode 402 of sufficient thickness (e.g., a thickness of from about 0.5 µm to about 1.5 µm, and ranges therebetween) is formed on the first contact 304.

As provided above, one point in the process flow where an optional lithiation/lithiating step can be carried out is immediately following formation of the cathode 402 (as well as after formation of the anode and/or after completion of the micro-battery stack—see below). Thus, optionally, as shown in FIG. 4 a lithiation/lithiating step is performed to introduce Li ions into the cathode/anode. According to an exemplary embodiment, the lithiation is carried out using chemical or electrochemical lithiation. Both of these lithiation processes were described in detail above.

Figure 5:
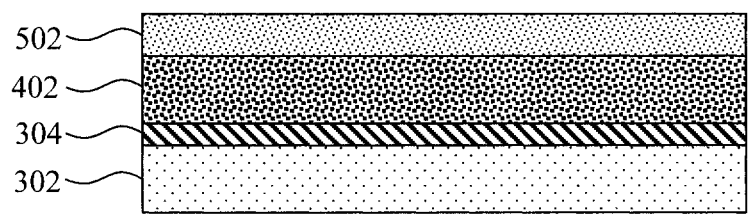
FIG. 5 is a cross-sectional diagram illustrating a solid electrolyte having been formed on the cathode according to an embodiment of the present invention.

Next, as shown in FIG. 5, a solid electrolyte 502 is formed on the cathode 402. As provided above, suitable materials for the solid electrolyte 502 include, but are not limited to, Li—Nb—O. A casting process, such as spin coating, can be used to deposit a solution containing lithium acetate lanthanum ethoxide and niobium oxide dissolved in a solvent (such as ethanol) onto the cathode 402 followed by an anneal (see above). The casting and annealing process can be iterated multiple times until a solid electrolyte 502 of sufficient thickness (e.g., a thickness of from about 0.5 µm to about 1.0 µm, and ranges therebetween) is formed on the cathode 402.

Figure 6:
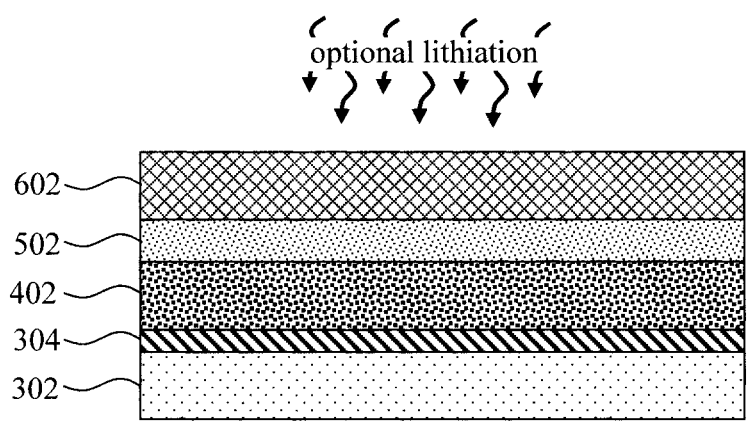
FIG. 6 is a cross-sectional diagram illustrating an anode having been formed on the solid electrolyte (followed by an optional lithiation) according to an embodiment of the present invention.

Next, as shown in FIG. 6, an anode 602 is formed on the solid electrolyte 502. As provided above, suitable materials for the anode 602 include, but are not limited to, Li—Ti—O. A casting process, such as spin coating, can be used to deposit a solution containing Ti isopropoxide, lithium acetate, acetic acid and water in a solvent (such as ethanol) onto the solid electrolyte 502 followed by an anneal (see above). The casting and annealing process can be iterated multiple times until an anode 602 of sufficient thickness (e.g., a thickness of from about 0.5 µm to about 1.5 µm, and ranges therebetween) is formed on the solid electrolyte 502.

As provided above, this is another point in the process where an optional lithiation can be carried out to drive Li ions into the cathode 402/anode 602 using chemical or electrochemical lithiation. See FIG. 6. Both of these lithiation processes were described in detail above. For clarity, the same patterning from FIG. 2 is used throughout the figures to indicate the layers of the micro-battery stack during the electroplating process.

Figure 7:
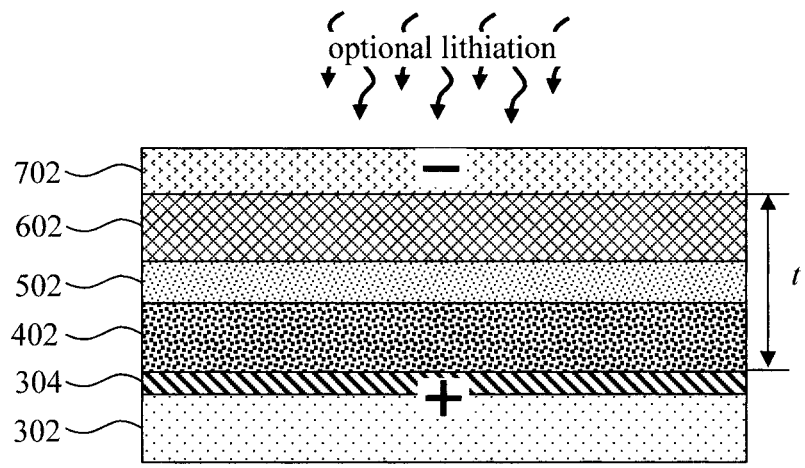
FIG. 7 is a cross-sectional diagram illustrating a second contact having been formed on the anode (followed by an optional lithiation) according to an embodiment of the present invention.

As shown in FIG. 7, a second contact 702 is formed on the anode 602. As provided above, suitable materials for the second contact 702 include, but are not limited to, a conductive carbon paste or metal. A conductive carbon paste can be painted onto the anode 602 followed by an anneal (see above). The painting and annealing process can be iterated multiple times until a second contact 702 of sufficient thickness (e.g., a thickness of from about 0.5 µm to about 1.0 µm, and ranges therebetween) is formed on the anode 602. A metal can be deposited onto the anode 602 by vacuum deposition, paste coating or mechanical pressing of a foil, forming a second contact 702 having a thickness of from about 0.5 µm to about 1.0 µm, and ranges therebetween.

As provided above, following completion of the micro-battery stack is yet another point in the process flow at which an optional lithiation/lithiating step can be carried out (as well as after formation of the cathode 402 and/or after formation of the anode 602). Thus, optionally, a lithiation/lithiating step is now performed to introduce Li ions into the cathode/anode using, e.g., chemical or electrochemical lithiation. See FIG. 7. Both of these lithiation processes were described in detail above.

As shown in FIG. 7, micro-battery now includes the substrate 302, the first contact 304 disposed on the substrate 302, the cathode 402 disposed on the first contact 304, the solid electrolyte 502 disposed on the cathode 402, the anode 602 disposed on the solid electrolyte 502, and the second contact 702 disposed on the anode 602. According to an exemplary embodiment, the substrate 302 (which in this example is electrically conductive) and the first contact 304 collectively serve as a positive (+) contact and the second contact 702 serves as a negative (−) contact of the micro-battery.

As shown in FIG. 7, the micro-battery is formed as a stack of these thin-film layers, one on top of the other. According to an exemplary embodiment, cathode 402, solid electrolyte 502, and anode 602 have a combined thickness t of from about 1.5 micrometers (µm) to about 3 µm, and ranges therebetween.

As highlighted above, the present micro-batteries are rechargeable. Specifically, the present micro-batteries can be charged, discharged (into a load), and recharged multiple times. Recharging simply entails connecting the micro-battery to a power source, such as a building wall outlet power source, automobile power source, etc. For some applications such as IOT systems, it is possible to use a renewable energy source such as photovoltaics for recharging. See, for example, U.S. patent application Ser. No. 15/281,870 by Antunez et al., entitled "Integrated CZT(S, Se) Photovoltaic Device and Battery," the contents of which are incorporated by reference as if fully set forth herein. Recharging generally involves connecting the positive and negative contacts of the micro-battery to the positive and negative terminals of the power source.

Figure 8:
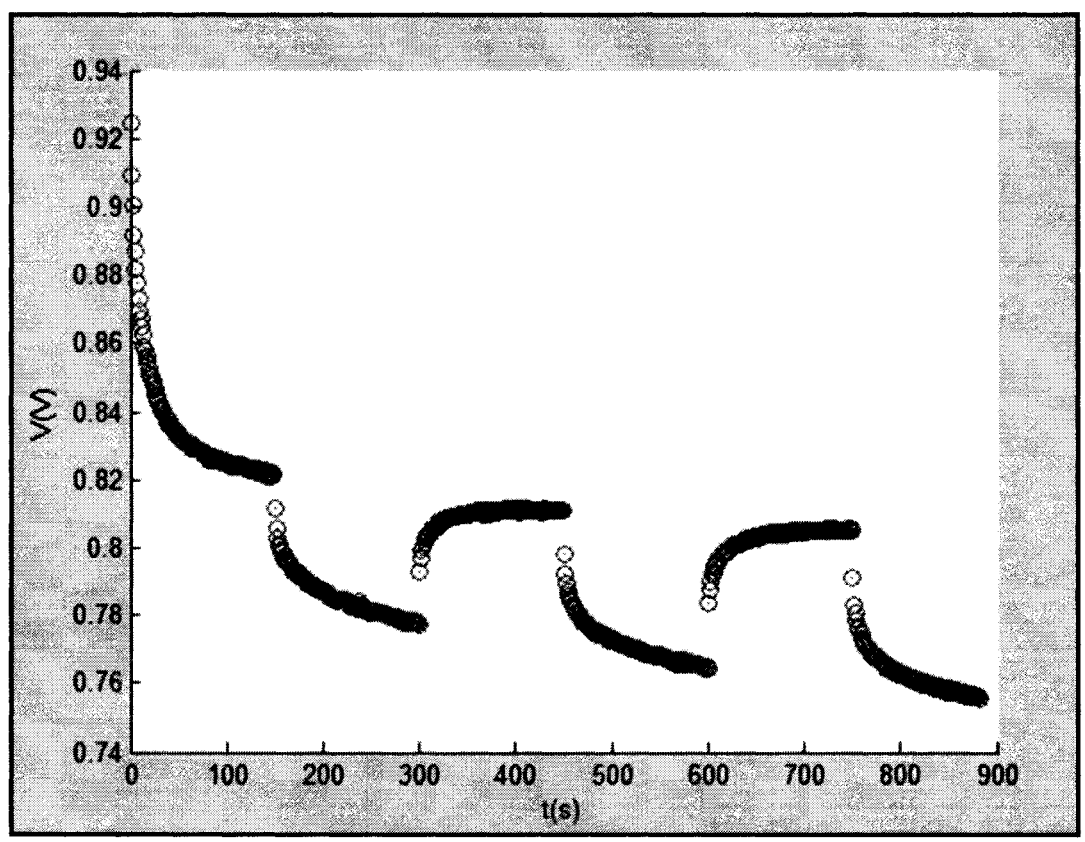
FIG. 8 is a diagram illustrating cycling performance of the present micro-battery according to an embodiment of the present invention.

Advantageously, the present micro-battery design provides excellent cycling performance. See, for example, FIG. 8 which illustrates charge and discharge values (measured in volts (V)) as a function of time t (measured in seconds (s)). As shown in FIG. 8, the present micro-battery shows a very narrow charge-discharge interval of 0.82 V-0.76 V, respectively.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method of forming a battery, the method comprising the steps of:
   forming a first contact on a substrate;
   forming a cathode on the first contact, wherein the cathode is formed from a vanadium-containing material;
   forming a solid electrolyte on the cathode;
   forming an anode on the solid electrolyte; and
   forming a second contact on the anode, wherein the solid electrolyte comprises lithium niobium oxide, and wherein the step of forming the solid electrolyte on the cathode comprises the steps of:
   preparing a solution comprising lithium acetate lanthanum ethoxide and niobium oxide dissolved in a solvent;
   depositing the solution onto the cathode;
   annealing the solution under conditions sufficient to form a layer of lithium niobium oxide on the cathode; and
   repeating the depositing and the annealing steps n times until the solid electrolyte having a desired thickness is produced on the cathode.

2. The method of claim 1, wherein the substrate is selected from the group consisting of: a glass substrate, a ceramic substrate, a polymer substrate, a silicon substrate, and a metal foil substrate.

3. The method of claim 1, wherein the first contact comprises a metal selected from the group consisting of: copper, indium, aluminum, nickel and combinations thereof.

4. The method of claim 1, wherein the step of forming the first contact on the substrate comprises the step of:
   electroplating the first contact onto the substrate.

5. The method of claim 1, wherein the vanadium-containing material comprises vanadium oxide, and wherein the step of forming the cathode on the first contact comprises the steps of:
   preparing a solution comprising vanadium oxytriisopropoxide dissolved in a solvent;
   depositing the solution onto the first contact;
   annealing the solution under conditions sufficient to form a layer of vanadium oxide on the first contact; and repeating the depositing and the annealing steps n times until the cathode having a desired thickness is produced on the first contact.

6. The method of claim 5, wherein the conditions comprise a temperature of from about 500° C. to about 600° C. and ranges therebetween, and a duration of from about 1 minute to about 5 minutes and ranges therebetween.

7. The method of claim 5, wherein the desired thickness of the cathode is from about 0.5 µm to about 1.5 µm and ranges therebetween.

8. The method of claim 1, wherein the conditions comprise a temperature of from about 500° C. to about 600° C. and ranges therebetween, and a duration of from about 1 minute to about 5 minutes and ranges therebetween.

9. The method of claim 1, wherein the desired thickness of the solid electrolyte is from about 0.5 µm to about 1.0 µm and ranges therebetween.

10. The method of claim 1, wherein the anode comprises lithium titanium oxide, and wherein the step of forming the anode on the solid electrolyte comprises the steps of:
preparing a solution comprising titanium isopropoxide and lithium acetate in a solvent;
depositing the solution onto the solid electrolyte;
annealing the solution under conditions sufficient to form a layer of lithium titanium oxide on the solid electrolyte; and
repeating the depositing and the annealing steps n times until the anode having a desired thickness is produced on the solid electrolyte.

11. The method of claim 10, wherein the conditions comprise a temperature of from about 500° C. to about 600° C. and ranges therebetween, and a duration of from about 1 minute to about 5 minutes and ranges therebetween.

12. The method of claim 10, wherein the desired thickness of the anode is from about 0.5 µm to about 1.5 µm and ranges therebetween.

13. The method of claim 1, wherein the second contact comprises conductive carbon, and wherein the step of forming the second contact on the anode comprises the steps of:
applying a conductive carbon paste onto the anode;
annealing the solution under conditions sufficient to form a layer of the conductive carbon on the anode; and
repeating the applying and the annealing steps n times until the second contact having a desired thickness is produced on the anode.

14. The method of claim 13, wherein the conditions comprise a temperature of from about 500° C. to about 600° C. and ranges therebetween, and a duration of from about 1 minute to about 5 minutes and ranges therebetween.

15. The method of claim 13, wherein the desired thickness of the second contact is from about 0.5 µm to about 1.0 µm and ranges therebetween.

16. The method of claim 1, wherein the second contact comprises a metal foil selected from the group consisting of: a copper foil, an indium foil, an aluminum foil, a nickel foil and combinations thereof, and wherein the step of forming the second contact on the anode comprises the step of:
pressing the metal foil onto the anode.

17. The method of claim 1, further comprising the step of:
lithiating the battery to introduce lithium ions into one or more of the cathode and the anode.

18. The method of claim 17, wherein the lithiating step comprises:
submerging the substrate, the first contact disposed on the substrate, the cathode disposed on the first contact, the solid electrolyte disposed on the cathode, and the anode disposed on the solid electrolyte in a liquid electrolyte;
submerging a lithium-containing electrode in the liquid electrolyte; and
applying a bias voltage to the first contact and the lithium-containing electrode to drive lithium ions from the lithium-containing electrode into one or more of the cathode and the anode.

19. The method of claim 18, wherein the liquid electrolyte comprises lithium hexafluorophosphate in ethylene carbonate.

* * * * *